United States Patent [19]

Chan et al.

[11] Patent Number: 5,777,918
[45] Date of Patent: Jul. 7, 1998

[54] FAST MULTIPLE OPERANDS ADDER/SUBTRACTER BASED ON SHIFTING

[75] Inventors: Kin Shing Chan, Austin, Tex.; Chiao-Mei Chuang, Cupertino, Calif.; Sang Hoo Dhong, Austin, Tex.; Alessandro Marchioro, Ferney-Voltaire, France

[73] Assignee: International Business Machines Corporation, Armonk, N.Y.

[21] Appl. No.: 600,691

[22] Filed: Feb. 13, 1996

Related U.S. Application Data

[60] Provisional application No. 60/009,087 Dec. 22, 1995.

[51] Int. Cl.[6] .................................................. G06F 7/50
[52] U.S. Cl. ............................ 364/786.04; 364/786.01; 364/784.01
[58] Field of Search .................... 364/786.04, 784.05, 364/784.03, 784.01, 786.01

[56] References Cited

U.S. PATENT DOCUMENTS

4,506,341   3/1985   Kalter et al. .................. 364/786.01

Primary Examiner—Tan V. Mai
Attorney, Agent, or Firm—Kevin M. Jordan

[57] ABSTRACT

A fast adder/subtracter using a decoder and shifting function instead of conventional full-adders is disclosed. The circuit is optimized for the addition of multiple operands up to 4–5 binary bits in magnitude. Using this method a subtraction operation can be performed at no added cost with respect to addition (compared to the conventional method requiring complementing one of the operands). Addition and subtraction of multiple operands is implemented by simple multiple shift operations. The multiple shift operations can be implemented as a chain of series NMOS pulldown devices with a precharged load providing considerable speed advantage over conventional solutions. Fast overflow detection may be implemented by or-ing the higher order bits in the shifter.

20 Claims, 9 Drawing Sheets

FAST MULTIPLE OPERANDS ADDER/ SUBTRACTER BASED ON SHIFTING

CROSS-REFERENCE TO RELATED APPLICATIONS

The present application claims priority to co-pending U.S. provisional application 60/009,087 filed Dec. 22, 1995.

FIELD OF THE INVENTION

The present invention is related to the field of electric circuits and in particular to addition/subtraction circuitry.

BACKGROUND

Digital systems often require the utilization of adders/ subtracters to perform operations on operands a few bits wide (up to 4–5) in magnitude. Such circuits are conventionally implemented using binary adders. When executing sequences of such operations, the circuit complexity of conventional full-adders could be a limiting factor to overall system performance. In particular, a subtraction operation using conventional full-adders is more costly than an addition operation in that a subtraction operation is typically performed by first complementing one of the operands which are then added. For the foregoing reasons, there is a need for a fast, multiple operand adder/subtracter which is both less complex than conventional adders/subtracters and for which subtraction is as efficient as addition.

SUMMARY

Therefore, it is an object of the present invention to provide a fast, multiple operand addition/subtraction circuit which by using a decoder and shifting function, is equally efficient for both addition and subtraction; and which is less complex than conventional full adders. In particular, the present invention is based on the observation that addition and subtraction can be reduced to the simpler operation of shifting if the two operands can be made available in a decoded representation. For example, the decimal number 3, which equals the 4-bit binary sequence '0011', could be represented as the 16-bit sequence '0000000000001000' in the decoded representation.

Once the operands are decoded, addition can be envisioned as a left shift and subtraction as a right shift. Thus, subtraction can be achieved at no additional cost with respect to addition (compared to the conventional method which first requires complementing one of the operands). When the second operand in an addition/subtraction operation is zero, no shift is necessary.

Addition and subtraction of multiple operands can be achieved by simple multiple shift operations. In a preferred embodiment, the multiple shift can be implemented as a chain of series NMOS pulldown devices with a precharged load giving a considerable speed advantage over conventional solutions. The design is particularly well-suited for cascading a sequence of additions/subtractions. Fast overflow detection may be implemented by simple or-ing the higher bits in the shifter.

An embodiment of a fast adder circuit according to the present invention for performing multiple operand arithmetic operations includes: a pair of decoders for decoding a first and a second operand into a respective first decoded operand and a second decoded operand; and a first shifting means coupled to the first and second decoded operands for shifting the first decoded operand according to the second decoded operand to generate a first decoded result representing one of a sum of and a difference between the second decoded operand and the first decoded operand. In a preferred embodiment the first and second operand are n-bit binary operands and the pair of decoders are n-to-$2^n$ decoders.

BRIEF DESCRIPTION OF THE DRAWINGS

These and other features, aspects, and advantages of the present invention will become better understood with reference to the following description, appended claims, and accompanying drawings wherein:

DETAILED DESCRIPTION

The present invention provides a fast addition/subtraction method on operands a few bits wide (up to 4–5 in magnitude) using an n-to-$2^n$ bit binary decoder and shifting function. Once the operands are decoded, addition can be envisioned as a left shift and subtraction as a right shift. Thus, subtraction can be achieved at no additional cost with respect to addition. Recall that the conventional subtraction method first requires complementing one of the operands. When the second operand in an addition/subtraction operation is zero, no shift is necessary.

Figure 1A:
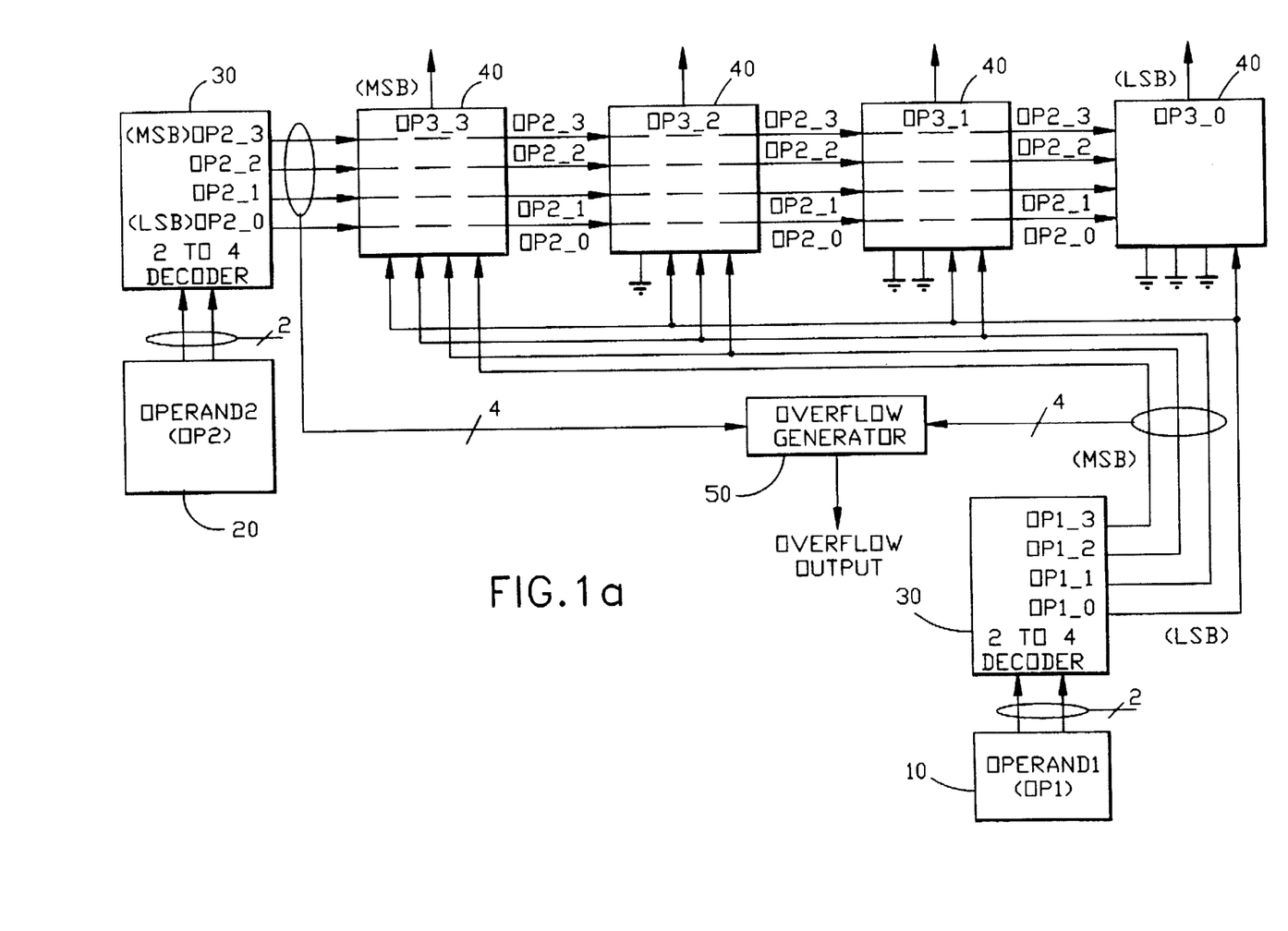
FIG. 1a is a block diagram for an embodiment of an adder according to the present invention for adding two binary 2-bit operands.

FIG. 1a is a block diagram of an embodiment for a multiple 2-bit operand adder according to the present invention. Those skilled in the art will appreciate that the present invention is easily extended to higher magnitude operands and that the scope of the present invention is not limited by the description. As shown in FIG. 1a, (an addend) operand1 10 and (an augend) operand2 20 both having a width of 2 bits (binary) are each coupled to a 2-to-4 decoder 30 which decodes each 2-bit binary input. A plurality of selectors 40 corresponding to the number of decoded outputs (4 in this case) is coupled to the decoded outputs for operand1 10 and operand2 20 such that the active bit for the addend operand1 is shifted to the left according to the active bit of augend operand2 20 to activate the selector 40 output representing the decoded sum. A subtraction operation, it will be seen, can be equally efficiently performed by shifting the minuend to the right by the amount given by the subtrahend. If the embodiment of the adder according to the present invention has a number of outputs limited to the number of inputs, an overflow generator 50 may be implemented by testing the most significant bits (MSB) of the selector 40.

A truth-table for a n-bit binary to-$2^n$ bit decoder 30 according to the embodiment of the present invention shown in FIG. 1a is illustrated in Table 1. The example shown in Table 1 is for a 4-bit binary input.

TABLE 1

| Input (n = 4-bit binary) | Decoded output (n = 4, $2^n$ = 16 lines) | Decimal Equivalent |
|---|---|---|
| 0000 | 0000000000000001 | 0 |
| 0001 | 0000000000000010 | 1 |
| 0010 | 0000000000000100 | 2 |
| 0011 | 0000000000001000 | 3 |
| 0100 | 0000000000010000 | 4 |
| 0101 | 0000000000100000 | 5 |
| 0110 | 0000000001000000 | 6 |
| 0111 | 0000000010000000 | 7 |
| 1000 | 0000000100000000 | 8 |
| 1001 | 0000001000000000 | 9 |
| 1010 | 0000010000000000 | 10 |
| 1011 | 0000100000000000 | 11 |
| 1100 | 0001000000000000 | 12 |
| 1101 | 0010000000000000 | 13 |
| 1110 | 0100000000000000 | 14 |
| 1111 | 1000000000000000 | 15 |

Figure 1B:
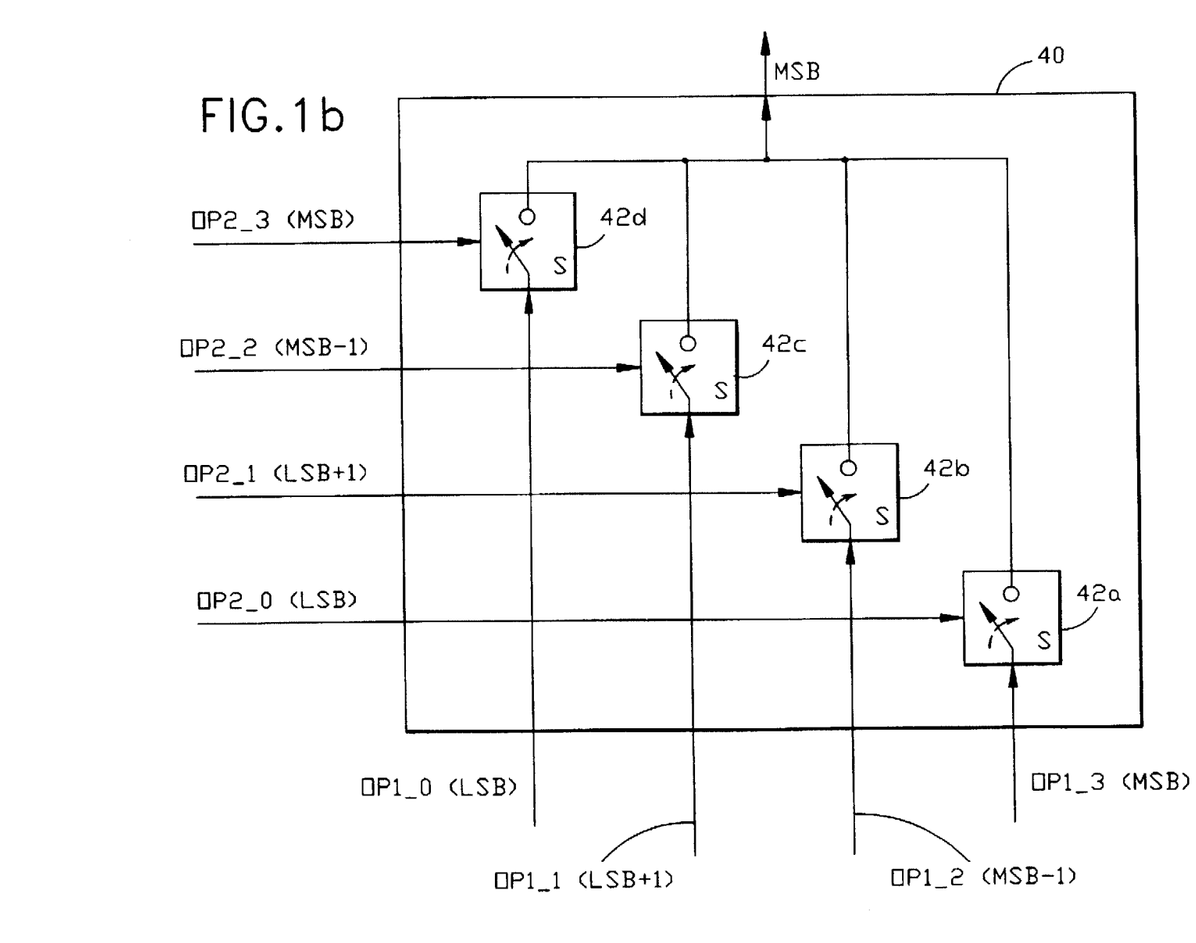
FIG. 1b shows an embodiment of a selector according to the present invention to perform the shifting function.

Note that for clarity, the order of the decoded outputs shown in FIG. 1a are arranged in increasing order of magnitude, i.e., from (OP1__0, and OP2__0) least significant bit (LSB) to MSB (OP1__3 and OP2__3). FIG. 1b shows an embodiment of the selector 40 according to the present invention which may perform the shifting operation. The selector 40 comprises a plurality of switches 42a, 42b, 42c, and 42d, each having 2 inputs and a single output which is active only when both inputs are active. As an example, the addition of operand1 (OP1) equal to b'01' and operand2 equal to b'10' is explained. Referring again to FIG. 1a and Table 1, in the decoded representation, operand1 (b'01') is equal to '0010' and operand2 (b'10') is equal to '0100'. The incoming active bits OP1__1 and OP2__2 operate to enable switch 42c in FIG. 1b. The selector output OP3__3 in FIG. 1a corresponding to the MSB is activated, thus achieving the required result '1000'.

Figure 1C:
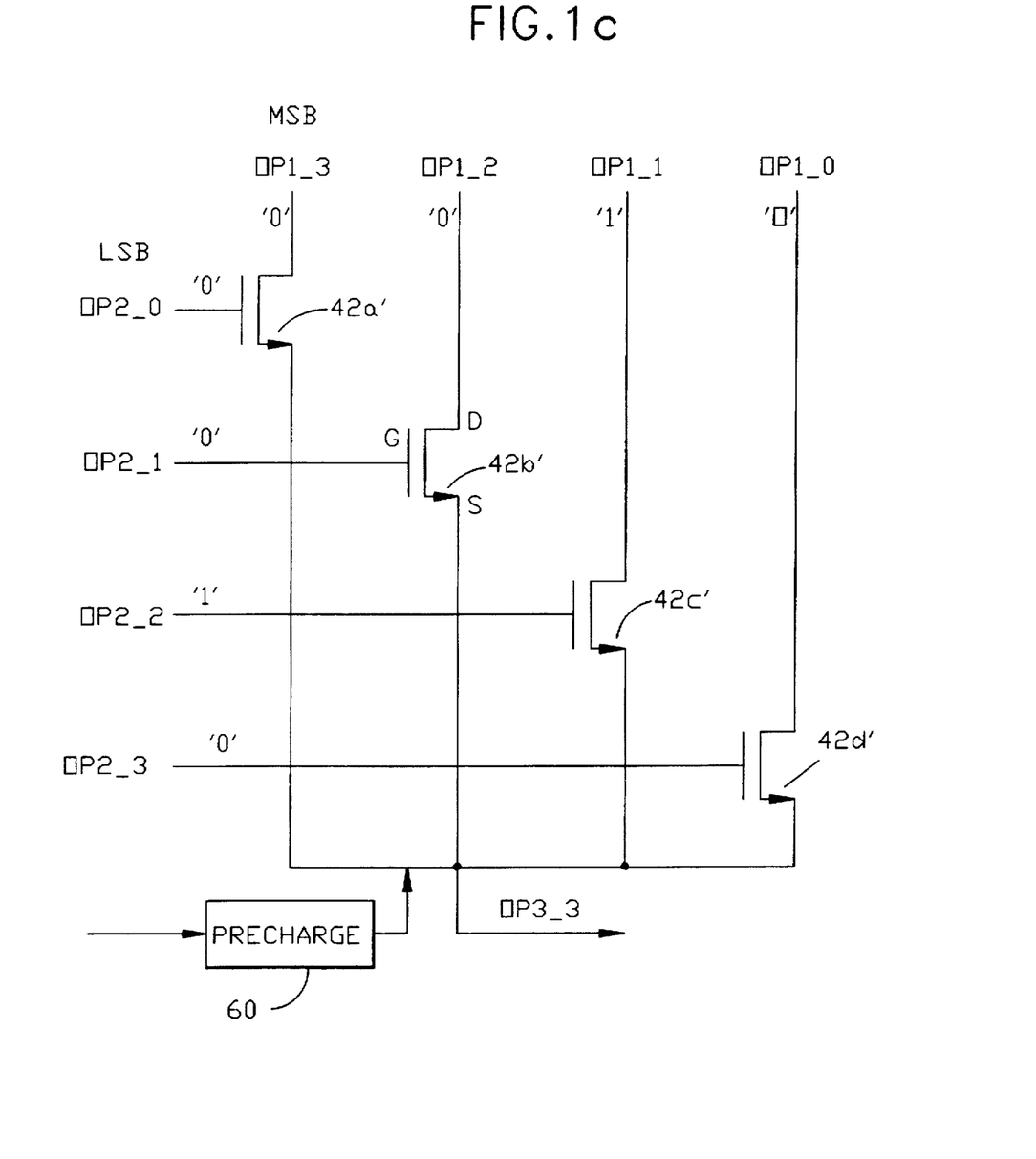
FIG. 1c shows an embodiment of the selector shown in FIG. 1b employing NMOS devices.

As shown in FIG. 1c, the selector 40 may be implemented by conventional NMOS pulldown devices 42a', 42b', 42c', and 42d'. A conventional precharged load 60 may also be applied, giving a considerable speed advantage over existing solutions. The embodiment shown in FIG. 1c, using NMOS enhancement type devices with the previous example of the addition of operand1 (OP1) equal to b'01' and operand2 (OP2) equal to b'10' with no precharge, is now explained. Referring again to FIG. 1a and Table 1, in the decoded representation, operand1 is equal to '0010' and operand2 is equal to '0100'. Referring now to FIG. 1c, the active bit OP2__1 at the gate (G) of NMOS device 42c' enables that device, causing the active bit OP1__1 to appear at the source (S). The output OP3__3 for selector block 40 which corresponds to the MSB is activated, thus achieving the required result '1000'.

Figure 1D:
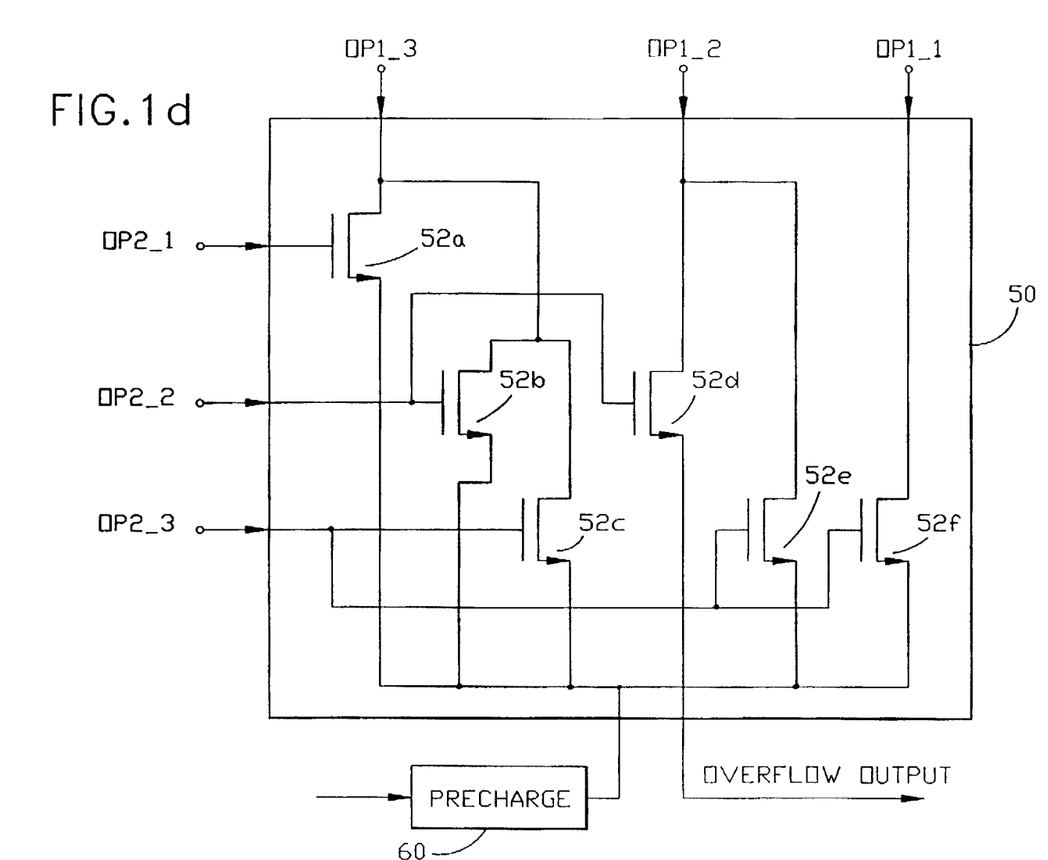
FIG. 1d shows an embodiment of an overflow circuit according to the present invention.

FIG. 1d shows an embodiment of an overflow generator according to the present invention which may be used when the number of outputs is limited to the number of inputs. This embodiment illustrates the case where 2 operands, each having a 2-bit binary input have been decoded according to Table 1 to produce the corresponding 4-bit decoded output. The fast overflow generator 50 of FIG. 1d may be implemented using a plurality of NMOS enhancement mode gates 52a, 52b, 52c, 52d, 52e, and 52f, which produce an active signal at the overflow output according to Table 2 by testing the most significant bits (MSB) of the selector 40.

TABLE 2

| Operand1 (OP1) | OPERAND2 (OP2) | OVERFLOW |
|---|---|---|
| 0010 | 1000 | YES |
| 0100 | 1000 | YES |
| 0100 | 0100 | YES |
| 1000 | 1000 | YES |
| 1000 | 0100 | YES |
| 1000 | 0010 | YES |

For example, the addition of operand1 (OP1) equal to b'01' and operand2 equal to b'11' is explained. Referring to Table 1, in the decoded representation, operand1 is equal to '0010' and operand2 is equal to '1000'. Referring now to FIG. 1d and Table 2, the incoming active bits OP1__1 and OP2__3 operate to select gate 52f. The overflow output for overflow generator 50 is activated, thus achieving the required result. Those skilled in the art will appreciate that the aforementioned overflow generator may also be implemented using the binary inputs to decoder 30.

Figure 1E:
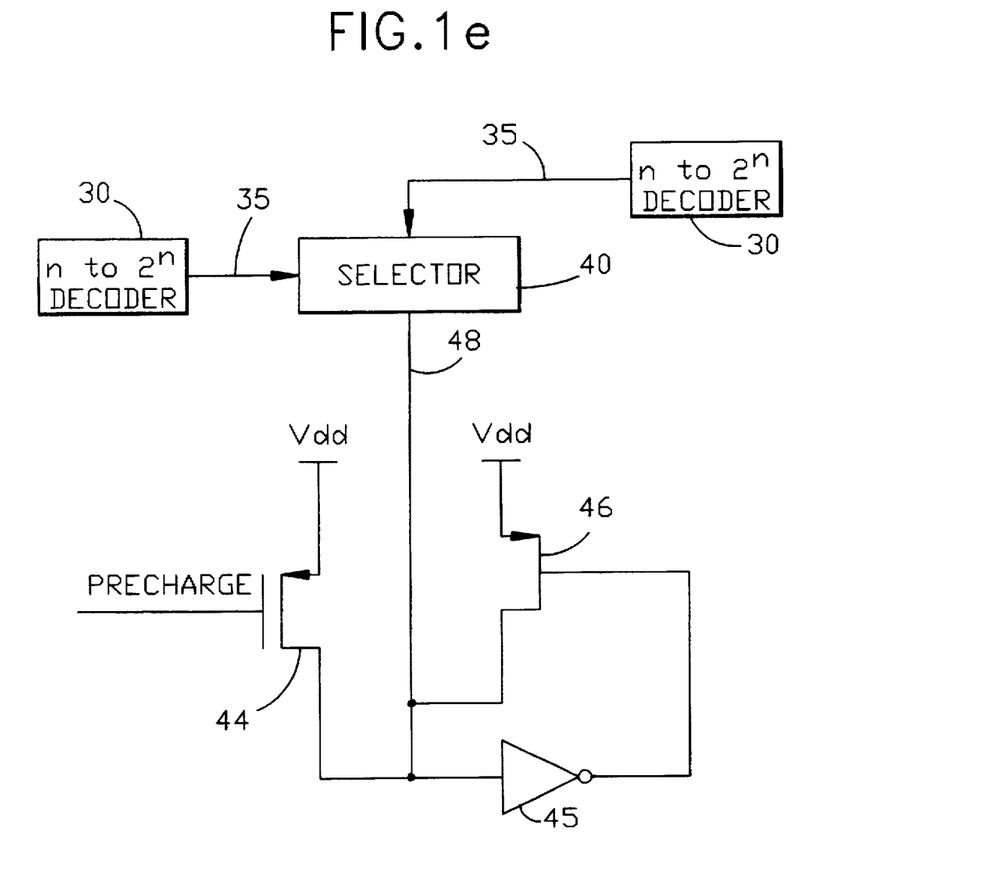
FIG. 1e shows an embodiment of a precharge circuit according to the present invention.

FIG. 1e illustrates an embodiment according to the present invention of a precharge circuit 60 which may be used to further improve performance. At the beginning of a cycle, the output 48 of selector 40 is precharged to a high logic level by turning on the precharge 'PMOS' transistor 44. The high logic level is latched to the output 48 through inverter 45 and PMOS transistor 46 so that transistor 44 may then be turned off. If the decoded outputs 35 supplied to selector 40 cause a low logic level to appear at the selector output 48, the precharge will be discharged to ground and the cycle may be repeated.

Figure 2A:
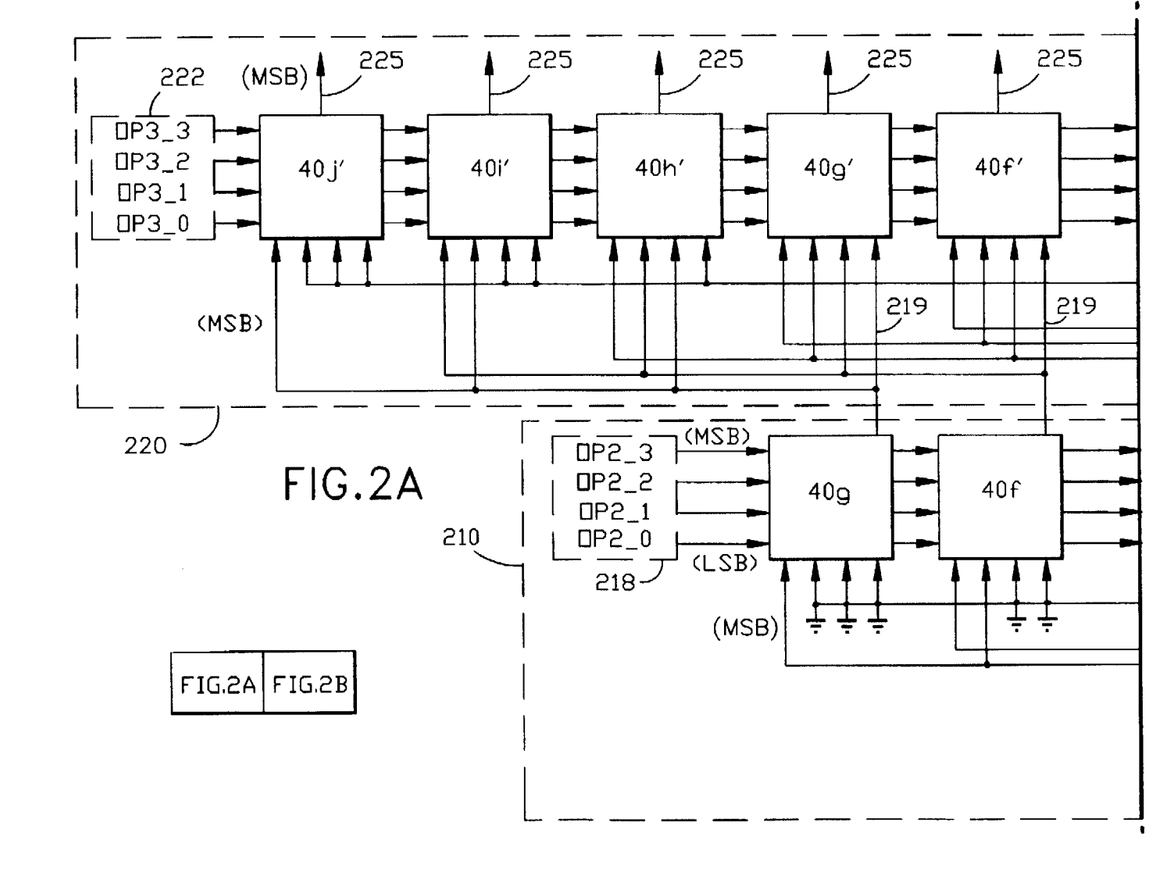
FIG. 2 shows an embodiment of two cascaded adders according to the present invention for adding three operands.
Figure 2B:
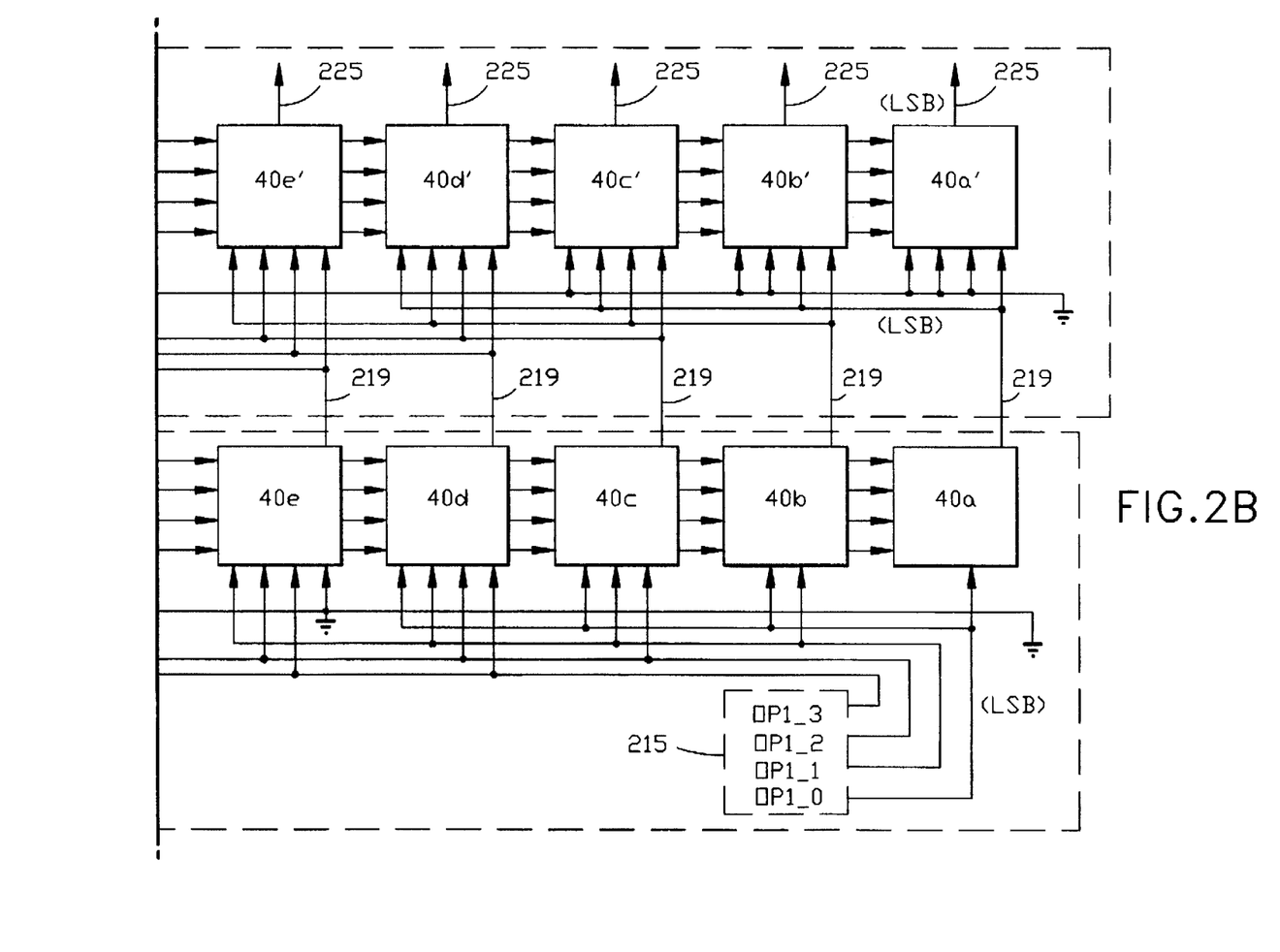

Those skilled in the art will appreciate that the adder/subtracter according to the present invention is particularly well-suited for cascading a sequence of additions/subtractions. FIG. 2 shows a block diagram of an embodiment of an adder according to the present invention for adding three operands by cascading a first adder to a second adder 220. Each adder preferably comprises a series of selectors 40 as described hereinbefore with reference to FIGS. 1a–1c. Each selector may be implemented with NMOS enhancement-type devices as described with reference to FIG. 1c. By way of illustration only, the addition of three (4-bit decoded) operands: operand1 (OP1) equal to binary '11'; operand2 (OP2) equal to binary '11'; and operand3 (OP3) equal to binary '01, is now explained. Referring to Table 1, in the decoded representation, both OP1 and OP2 are equal to '1000', and OP3 is equal to '0010'. Referring again to FIG. 2, OP1 and OP2 are first applied to inputs 215 and 218, respectively, of adder 210 with active MSBs OP1__3 and OP2__3 enabling the output of selector 40 g to produce the required intermediate decoded result '1000000' at the outputs 219 of the selectors 40g through 40a. The intermediate decoded result is coupled to one set of inputs of adder 220 while the decoded input '0010' (OP3) is applied to input 222 of the adder 220. The applied inputs enable the output of selector 40h', thus achieving the required result '0010000000' at the outputs 225 of selectors 40j' through 40a', respectively.

Figure 3:
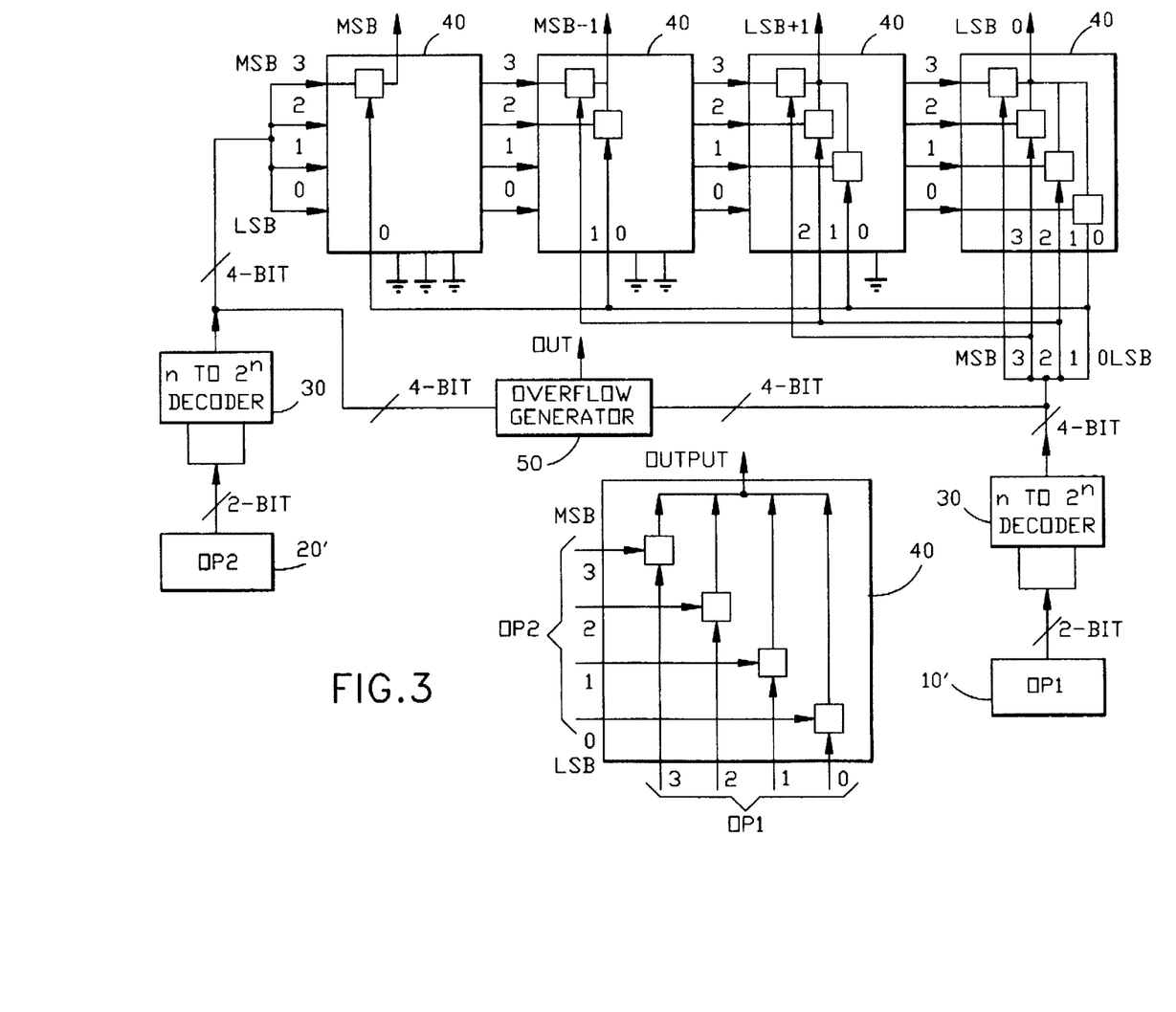
FIG. 3 is a block diagram for an embodiment of a subtracter according to the present invention for subtracting two 2-bit binary operands.

FIG. 3 is a block diagram of an embodiment for a multiple 2-bit operand subtracter according to the present invention. As discussed previously, those skilled in the art will appreciate that the present invention is easily extended to higher magnitude operands and that the scope of the present invention is not limited by the description. As shown in FIG. 3, (a minuend) OP1 10' and (a subtrahend) OP2 20' both having a width of n=2 bits (binary) are each coupled to a 2-to-4 (n to $2^n$) decoder 30 which decodes each 2-bit binary input. A plurality of selectors 40 corresponding to the number of decoded outputs (4 in this case) is coupled to the decoded outputs for OP1 10' and OP2 20' such that the active bit for OP1 10' is shifted to the right according to the active bit of OP2 20' to activate the selector 40 output representing the decoded result. Thus, a subtraction operation can be equally efficiently performed (as compared to addition) by shifting the minuend to the right by the amount given by the subtrahend.

Figure 4:
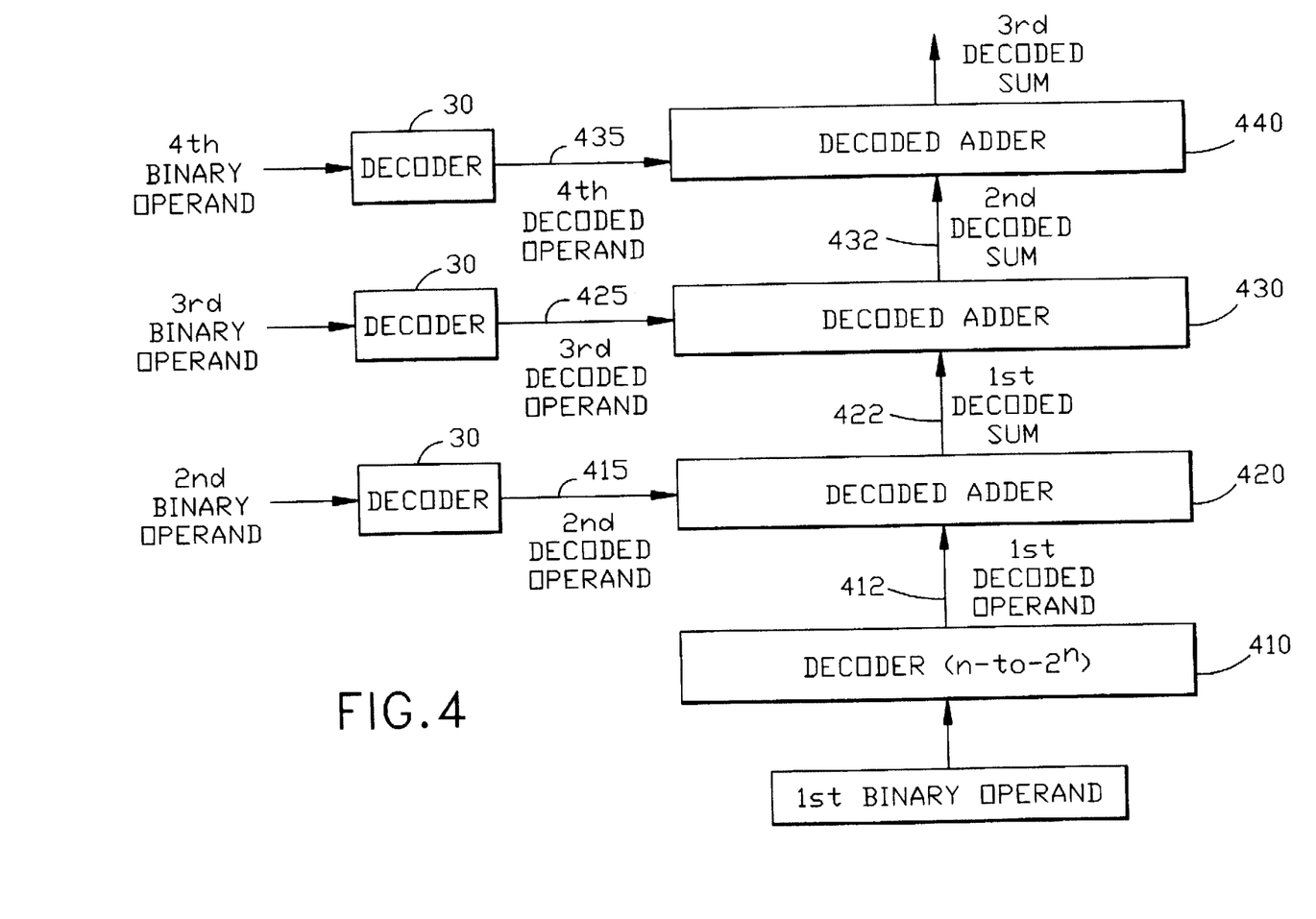
FIG. 4 shows an embodiment of a method according to the present invention for adding multiple binary 2-bit operands.

FIG. 4 shows an embodiment of a method according to the present invention for adding multiple binary 2-bit operands. In step 410, a first n-bit binary operand is input to decoder 30 and decoded into a first $2^n$ bit decoded operand 412. Similarly, a second n-bit binary operand is input to a second decoder 30 and decoded into a second $2^n$ bit decoded operand 415. In step 420, the first and second $2^n$ bit decoded operands may be input to $(2^n+2^n-1)$ selectors 40 such that an active bit in the first $2^n$ bit decoded operand 412 is shifted to the left according to an active bit in the second $2^n$ bit decoded operand 415 to activate the selector output representing the first decoded sum 422. Steps 430 and 440 illustrate that additional sequential operations may be performed by cascading the adders as was described with reference to FIG. 2. For example, a third n-bit binary operand may be input to a third decoder 30 and decoded into a third $2^n$ bit decoded operand 425. In step 430, the first decoded sum 422 and the third 2 bit decoded operand 425 are input to an appropriate number of selectors 40 such that an active bit in the first decoded sum 422 is shifted to the left according to an active bit in the third $2^n$ bit decoded operand 425 to activate the selector output representing the second decoded sum 432. Those skilled in the art will appreciate that since the inputs and outputs of the cascaded stages are in decoded form, no intermediate stages are required.

Now that the invention has been described by way of a specific embodiment, various modifications and alternative versions will occur to those of skill in the art. Thus, it should be understood that the description has been provided as an example and not as a limitation. The scope of the invention is accordingly defined by the appended claims.

What is claimed is:

1. A circuit for performing multiple operand arithmetic operations, comprising:

a pair of n-to-$2^n$ decoders for decoding a first and a second n-bit binary operand into a respective first decoded operand and a second decoded operand; and first shifting means coupled to said first and second decoded operands for shifting said first decoded operand to the left according to said second decoded operand to generate a first decoded sum representing the addition of said second decoded operand to said first decoded operand.

2. The circuit of claim 1 for adding at least a third n-bit binary operand to said first decoded sum, comprising:

a third n-to-$2^n$ decoder for decoding said third n-bit binary operand into a third decoded operand;

second shifting means, coupled to said third n-to-$2^n$ decoder and coupled to said first shifting means, for shifting said first decoded sum to the left according to said third decoded operand to generate a second decoded sum representing the addition of said third decoded operand to said first decoded sum.

3. The circuit of claim 1, further comprising:

third shifting means coupled to said first and second decoded operands for shifting said first decoded operand to the right according to said second decoded operand to generate a first decoded difference representing the subtraction of said second decoded operand from said first decoded operand.

4. The circuit of claim 1 wherein said first shifting means comprises solid state switch devices.

5. The circuit of claim 4 wherein said solid state switch devices comprise MOS devices.

6. The circuit of claim 5 wherein said MOS devices comprise NMOS pull-down devices.

7. The circuit of claim 1 wherein said first shifting means comprises $2^n$ shifting elements, each shifting element inputting at least one bit of said first decoded operand and $2^n$ bits of said second decoded operand and outputting one bit of said $2^n$ bit decoded sum.

8. The circuit of claim 7, comprising overflow generation means, coupled to said first and second decoded operands, for generating an overflow bit wherein said arithmetic operation represents an addition.

9. The circuit of claim 1 further comprising a precharge circuit having a precharge input and a precharge output, the precharge output being coupled to an output of said first shifting means for precharging the output of said first shifting means when a precharge input signal is applied to the precharge input.

10. A computer-implemented method for performing multiple operand arithmetic operations, comprising the steps of:

decoding a first n-bit binary operand and second n-bit binary operand into a respective first decoded $2^n$ bit operand and a second decoded $2^n$ bit operand;

shifting said first decoded $2^n$ bit operand to the left according to said second decoded $2^n$ bit operand to generate a first decoded sum representing the addition of said second decoded $2^n$ bit operand to said first decoded $2^n$ bit operand.

11. The computer-implemented method of claim 10 for adding at least a third n-bit binary operand to said first decoded sum, comprising the steps of:

decoding said third n-bit binary operand into a third decoded $2^n$ bit operand; and shifting said first decoded sum to the left according to said third decoded $2^n$ bit operand to generate a second decoded sum representing the addition of said third decoded $2^n$ bit operand to said first decoded sum.

12. The computer-implemented method of claim 10, comprising the steps of:

shifting said first decoded $2^n$ bit operand to the right according to said second decoded $2^n$ bit operand to generate a first decoded difference representing the subtraction of said second decoded $2^n$ bit operand from said first decoded $2^n$ bit operand.

13. A circuit for performing multiple operand arithmetic operations, comprising:

a pair of decoders for decoding a first operand and a second operand into a respective first decoded operand and a second decoded operand; and first shifting means coupled to said first and second decoded operands for shifting said first decoded operand according to said second decoded operand to generate a first decoded result representing one of a sum of and a difference between said second decoded operand and said first decoded operand.

14. The circuit of claim 13 wherein said first operand and said second operand are n-bit binary operands and said pair of decoders are n-to-$2^n$ decoders.

15. The circuit of claim 13 wherein said first shifting means further comprises:

means for shifting said first decoded operand to the left according to said second decoded operand to generate a first decoded sum representing the addition of said second decoded operand to said first decoded operand.

16. The circuit of claim 13 wherein said first shifting means further comprises:

means for shifting said first decoded operand to the right according to said second decoded operand to generate a first decoded difference representing the subtraction of said second decoded operand from said first decoded operand.

17. The circuit of claim 13, further comprising:

a third decoder for decoding a third operand into a third decoded operand; and second shifting means, coupled to said third decoder and coupled to said first shifting means, for shifting said first decoded result according to said third decoded operand to generate a second decoded result representing one of a sum of and a difference between said second decoded operand and said first decoded result.

18. The circuit of claim 17 wherein said third operand is an n-bit binary operand and said third decoder is an n-to-$2^n$ decoder.

19. The circuit of claim 17 wherein said second shifting means further comprises:

means for shifting said first decoded result to the left according to said third decoded operand to generate a second decoded sum representing the addition of said third decoded operand to said first decoded result.

20. The circuit of claim 17 wherein said second shifting means further comprises:

means for shifting said first decoded result to the right according to said third decoded operand to generate a second decoded difference representing the subtraction of said third decoded operand from said first decoded result.

\* \* \* \* \*